Aug. 8, 1933.　　　　　A. BUCHI　　　　　1,921,906
EXHAUST TURBO-CHARGED, DOUBLE-ACTING INTERNAL COMBUSTION ENGINE
Filed Oct. 21, 1929　　　7 Sheets-Sheet 1
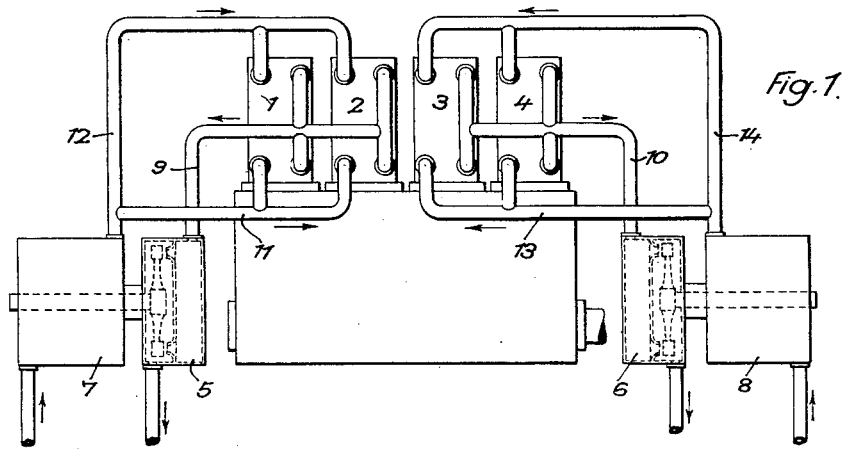
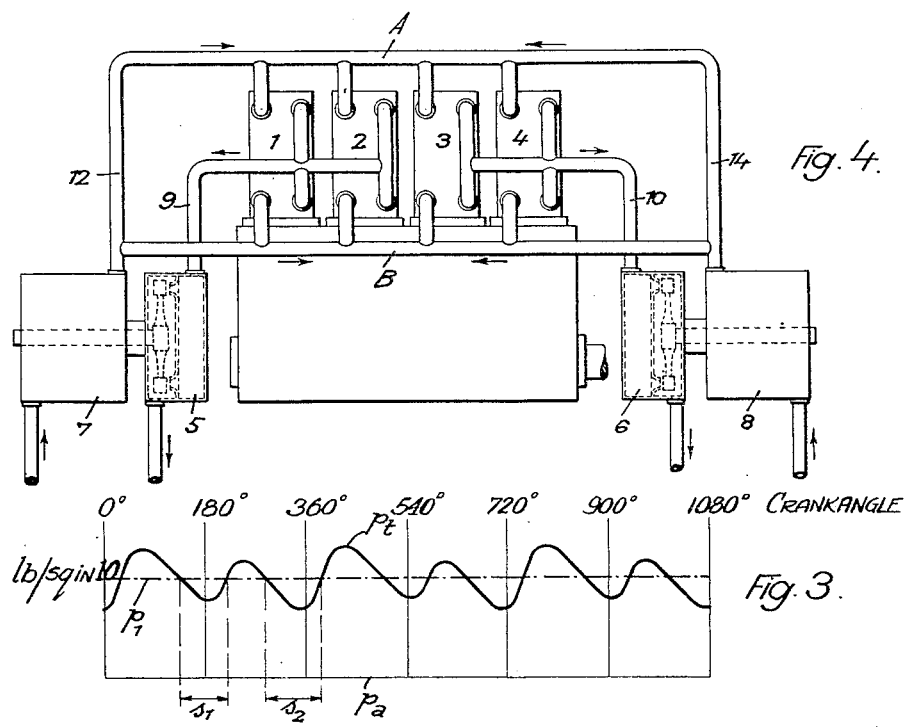

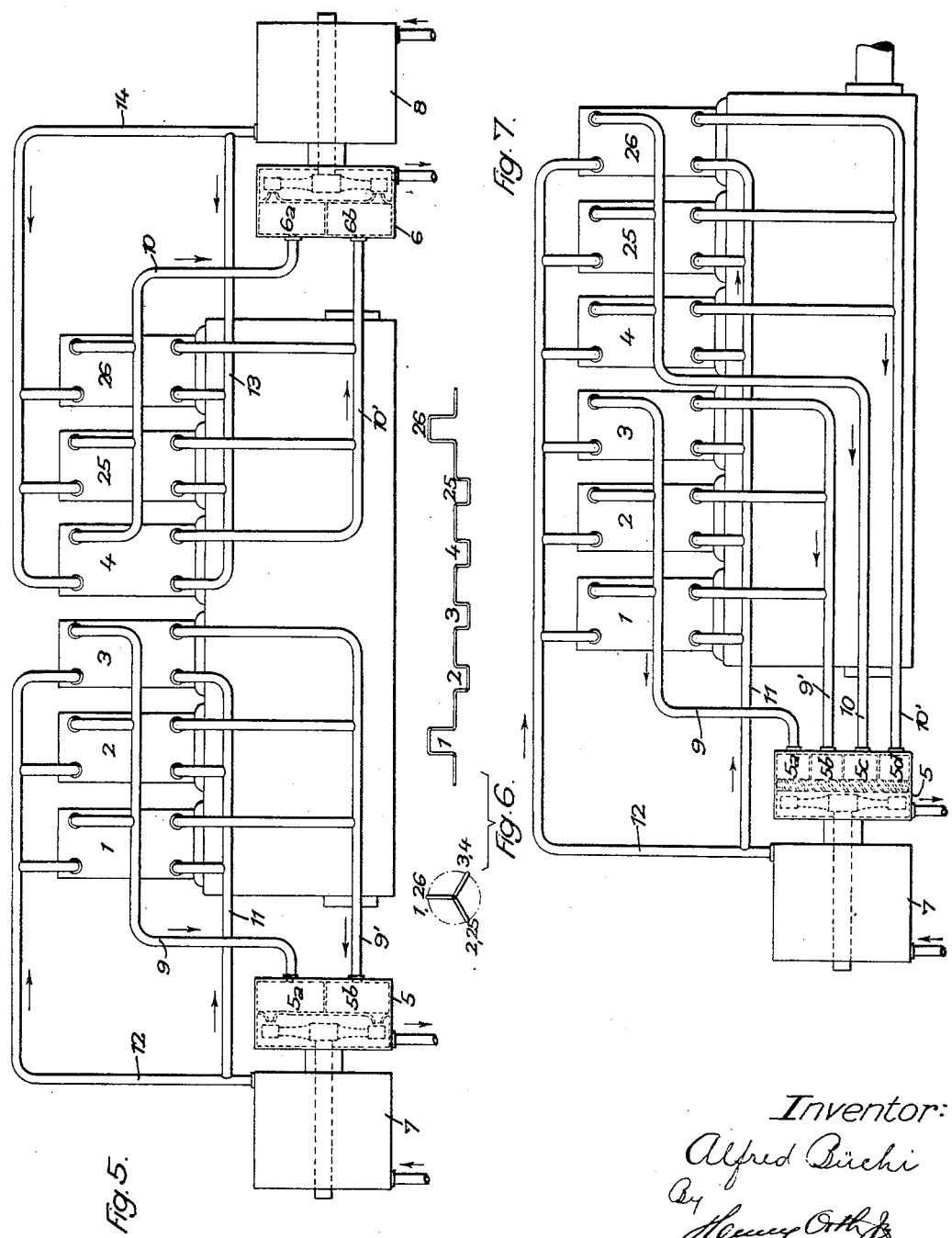

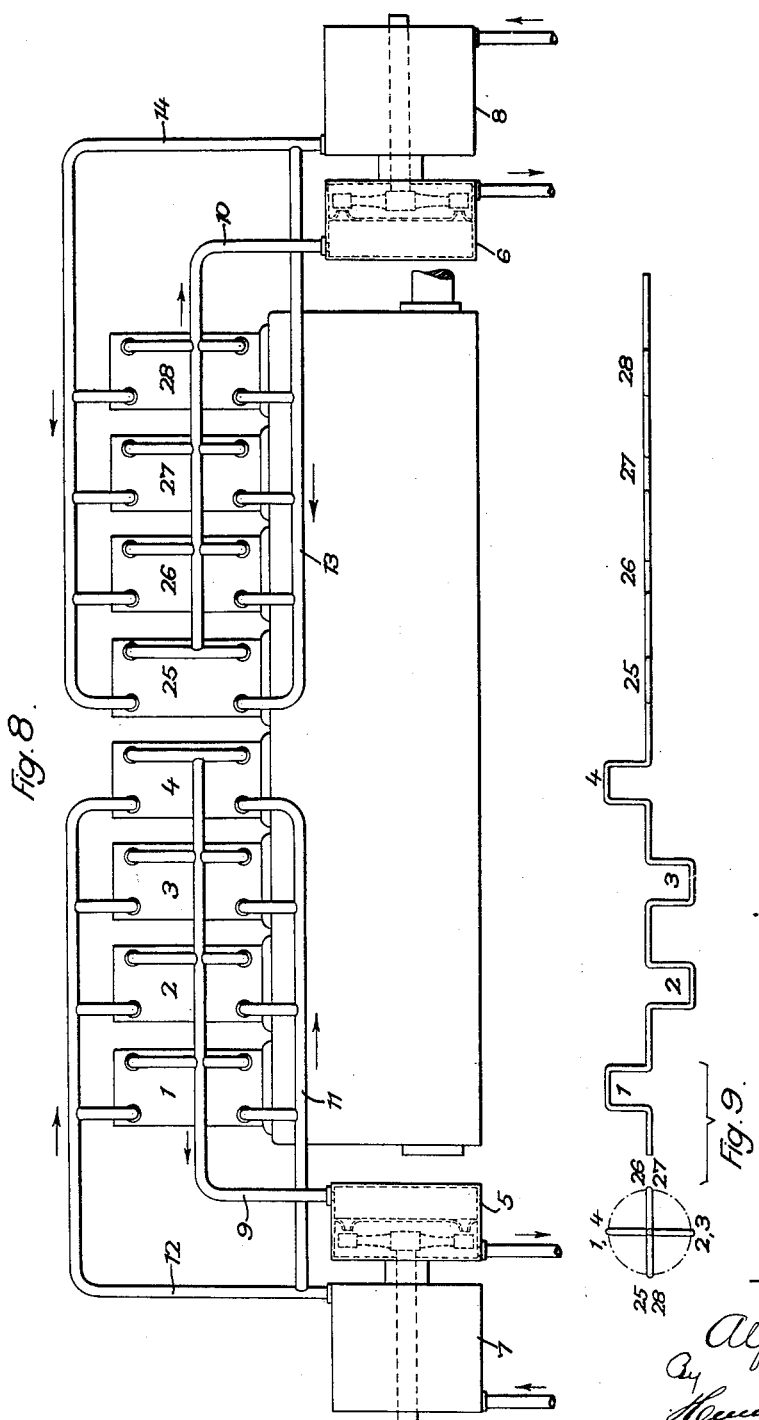

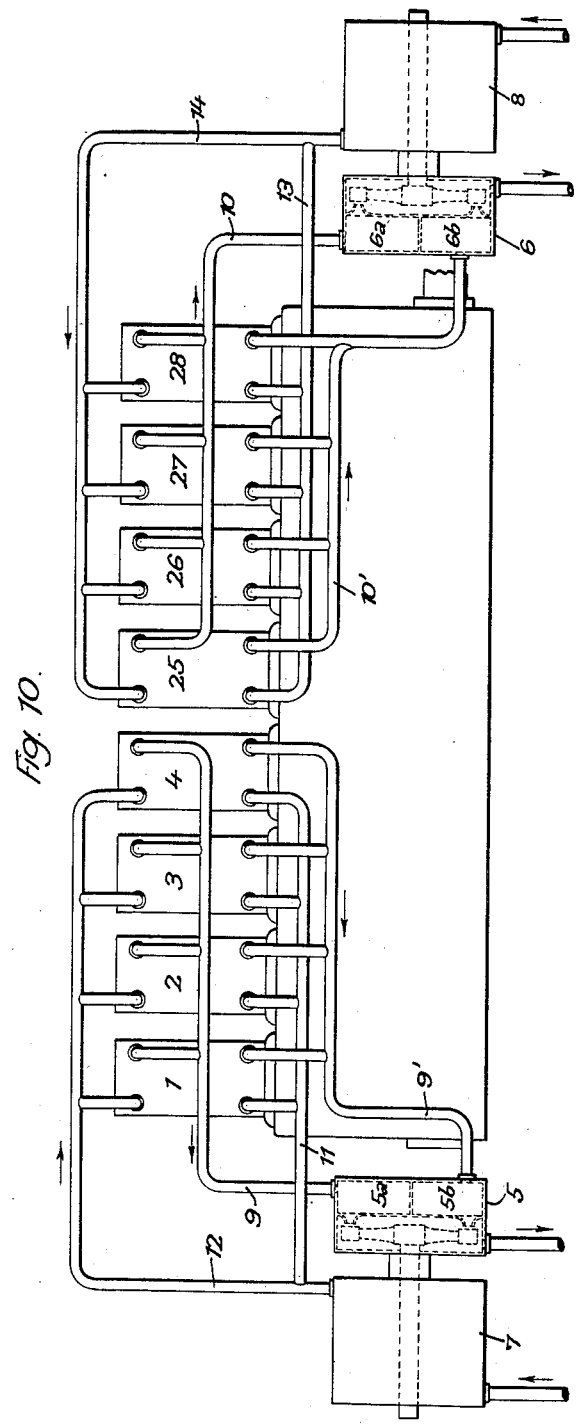

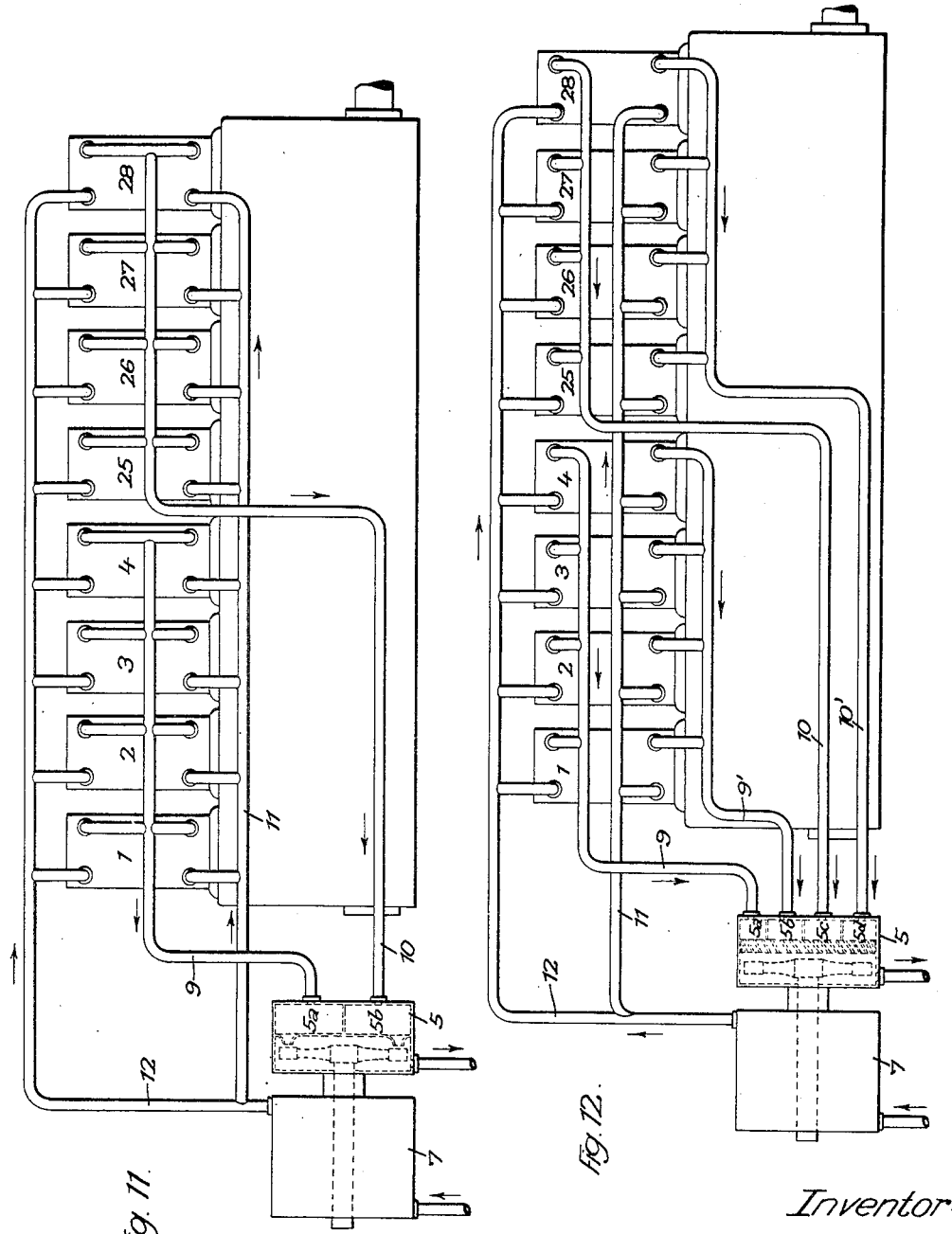

Aug. 8, 1933.  A. BUCHI  1,921,906
EXHAUST TURBO-CHARGED, DOUBLE-ACTING INTERNAL COMBUSTION ENGINE
Filed Oct. 21, 1929    7 Sheets-Sheet 6
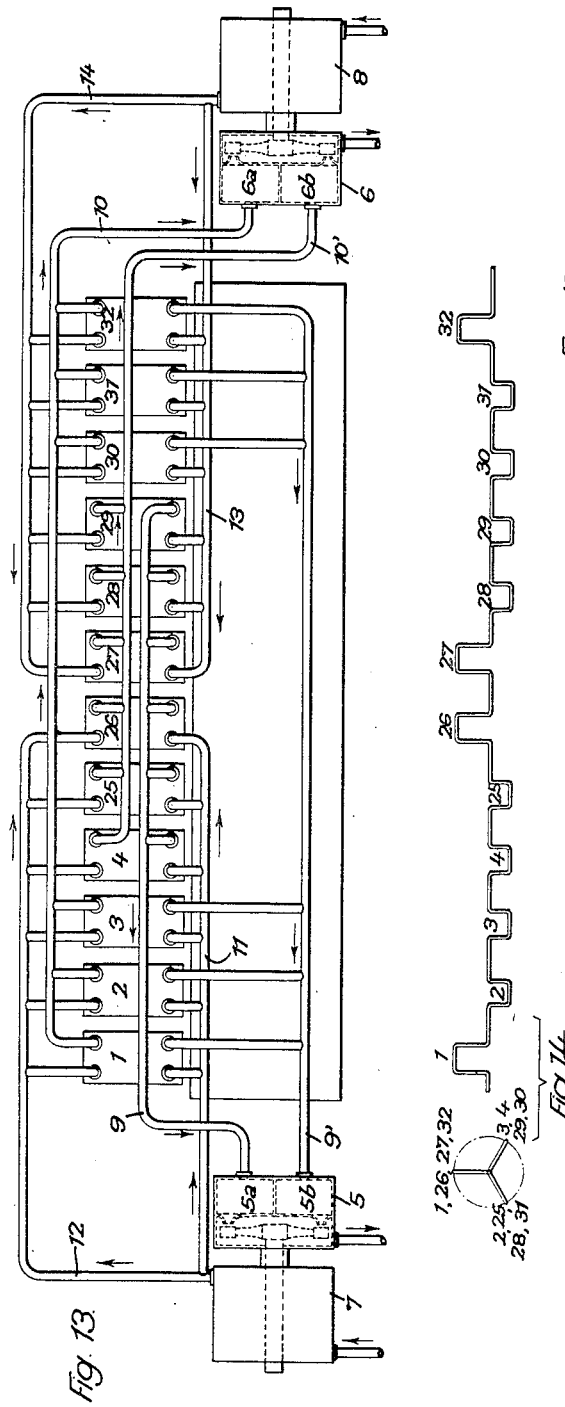
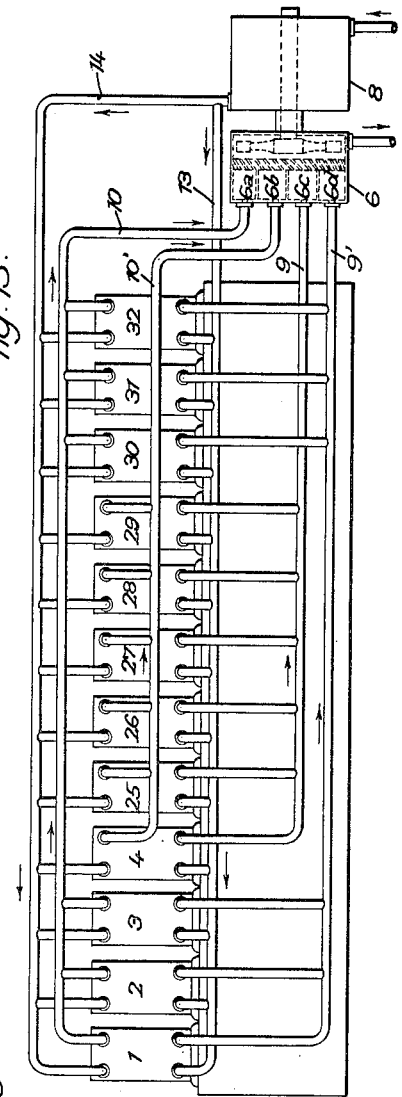
Inventor:
Alfred Büchi
By Henry Orth Jr.
atty.

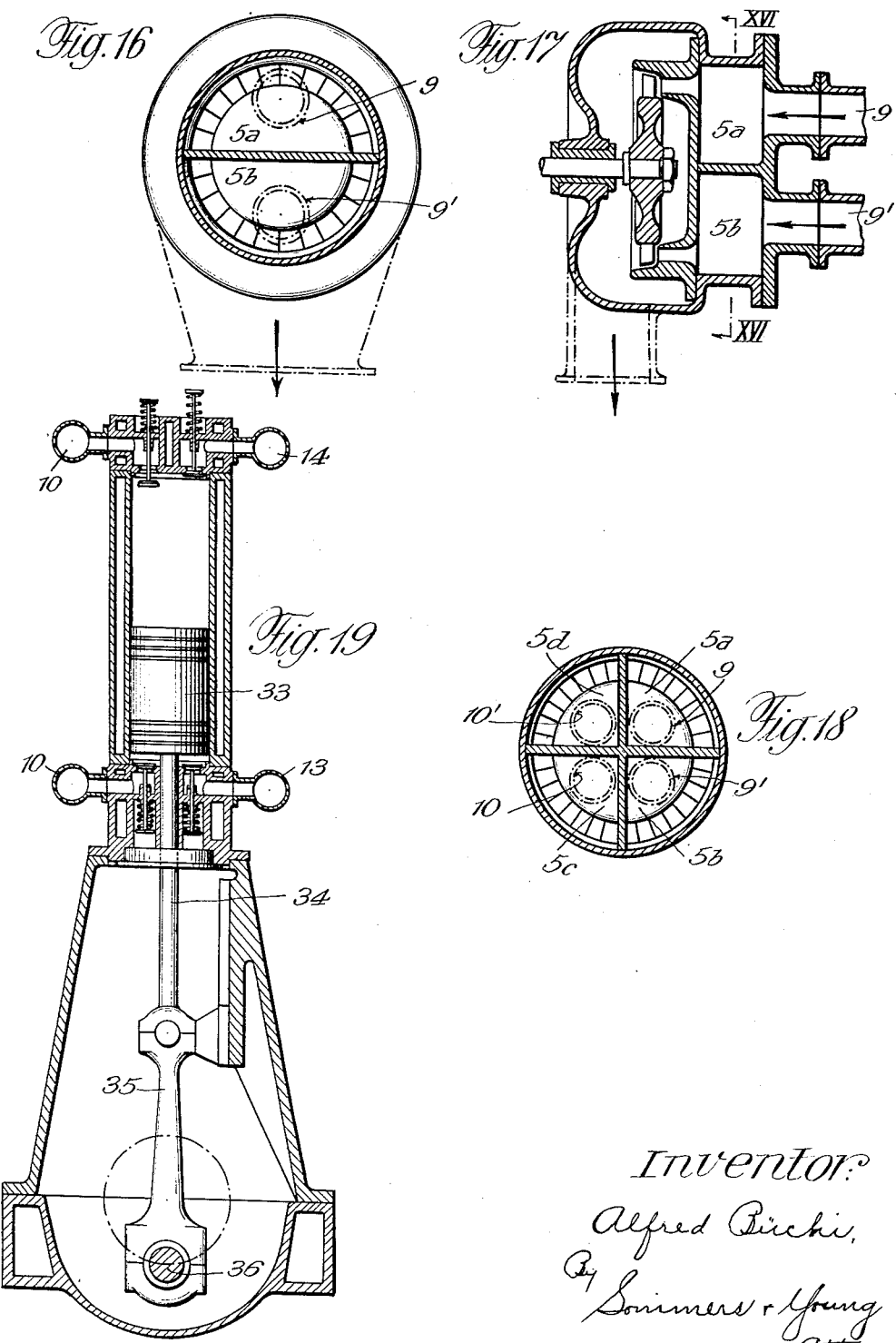

Patented Aug. 8, 1933

1,921,906

UNITED STATES PATENT OFFICE 1,921,906

EXHAUST TURBO-CHARGED, DOUBLE-ACTING INTERNAL COMBUSTION ENGINE

Alfred Buchi, Winterthur, Switzerland

Application October 21, 1929, Serial No. 401,235, and in Switzerland October 26, 1928

2 Claims. (Cl. 60—13)

The present invention relates to double-acting internal combustion engines having charging compressors driven by exhaust turbines. According to the invention those outer or inner (or upper and lower with vertical engines) ends of the cylinders the ignitions of which succeed each other at crank angles of approximately 150° or more, exhaust into the same exhaust turbine or into the same chamber of the exhaust turbine respectively, whilst the charging compressors deliver the compressed air to the respective cylinders through conduits connected to each other. In particular the embodiment of the invention may be so that with four cylinders two exhaust turbines or two turbine chambers respectively are provided, in which case every four cylinder ends exhaust into the same turbine or into the same turbine chamber respectively; with six-cylinder engines, for instance, two turbines having two turbine chambers each may be provided into each of which three cylinder ends exhaust; with eight-cylinder engines two exhaust turbines with two chambers in every turbine may be provided, whereby four cylinder ends exhaust into each of the four turbine chambers; with twelve-cylinder engines two turbines each having two chambers may be provided, whereby six cylinder ends exhaust into every turbine chamber, and so on.

Constructional examples of the invention are diagrammatically illustrated in the accompanying drawings, in which:

Fig. 1 shows an embodiment of the invention in a four cylinder engine, (firing order 1—2—4—3), Fig. 2 illustrates diagrammatically the crank positions of the engine, Fig. 3 is a pressure diagram, Fig. 4 is a modified constructional example referring to a four cylinder engine, (firing order 1—2—4—3), Fig. 5 shows an embodiment of the invention in a six cylinder engine, (firing order 1—5—3—6—2—4), Fig. 6 illustrates the crank positions of the engine shown in Fig. 5, Fig. 7 is a modification of Fig. 5;

Fig. 8 shows an embodiment of the invention in an eight cylinder engine, (firing order 1—25—2—26—4—28—3—27), Fig. 9 illustrates the crank positions of the engine shown in Fig. 8, Figs. 10-12 are modifications of Fig. 8, Fig. 13 shows an embodiment of the invention in a twelve cylinder engine, (firing order 1 and 32—25 and 28—3 and 30—26 and 27—2 and 31—4 and 29), Fig. 14 illustrates the crank positions of the engine shown in Fig. 13, and Fig. 15 is a modification of Fig. 13.

Fig. 16 is a side sectional view of a turbine shown diagrammatically in Fig. 5, taken on the plane XVI—XVII of Fig. 17, Fig. 17 is a sectional view of a turbine of Fig. 5 taken at right angles to Fig. 16, Fig. 18 is a side sectional view of the turbine shown diagrammatically in Fig. 7, and Fig. 19 is a sectional view through a cylinder of the double-acting internal combustion engine.

Referring now to the drawings, Fig. 1 shows a double-acting four cylinder internal combustion engine having cylinders 1, 2, 3 and 4. 5 denotes one of the exhaust turbines and 6 is the other. 7 and 8 are the respective compressors driven by these exhaust turbines.

The arrangement of the cranks of this engine is illustrated in Fig. 2. All the cranks are situated in one plane so that the ignitions in every two cylinder ends succeed each other at crank angles of 180°. According to the invention those upper and lower ends of the cylinders the ignitions in which succeed each other at crank angles of 180° exhaust into the same exhaust turbine, that is to say the upper and lower ends of the cylinders 1 and 2 exhaust through the conduit 9 into the exhaust turbine 5 and the upper and lower ends of the cylinders 3 and 4 exhaust through conduit 10 into the exhaust turbine 6. The compressor 7 delivers air for charging purposes through the conduits 11 and 12 to both ends of the cylinders 1 and 2 and the compressor 8 delivers its charging air through the conduits 13 and 14 to both ends of the cylinders 3 and 4.

In Fig. 3 the change of pressure in front of one of the two turbines 5 or 6 respectively is indicated by the curve $p_t$. $p_a$ denotes the line of atmospheric pressure; $p_l$ denotes the charging pressure. The latter is approximately constant, whilst the exhaust pressure $p_t$ in front of the turbine varies in a comparatively high degree, in as much as the illustrated example refers to an engine in which the volume of the exhaust conduit between the internal combustion engine and the turbine is comparatively small. The variation in the pressure $p_t$ is irregular, the higher pressures are derived from the upper ends of the cylinders and, due to part of the volume being occupied by the piston rod, the lower pressures from the lower ends of the cylinders. Means for differently influencing the exhaust pressure at the two cylinder ends are disclosed in my copending application Serial number 401,234. Thus it will be seen that with engines being scavenged the arrangement according to the invention permits to obtain on one of the cylinder ends, for instance on the lower ends, a lower exhaust pressure and therefore a longer and more pronounced scavenging period $s_2$ than the period $s_1$ for the other ends of the cylinders, for instance the upper ends. This occurs because the lower or inside combustion chamber is passed by the piston rod and therefore the swept volume is smaller than the swept volume of the upper or outside chamber. Upper and lower cylinder chambers exhaust into the same manifold. It is obvious that more exhaust gases result from the upper sides due to the larger swept volume. The pressure in the exhaust manifold is therefore higher during the exhaust periods of the upper chambers than during the exhaust periods of the lower chambers. Upper and lower chambers are charged at the same pressure. As the two different quantities of exhaust gases (from the upper and lower chambers respectively) are led into the same manifold which is of a predetermined volume, the pressures must become different. The pressures are naturally the higher, the larger the amount of exhaust gases passing into one of the manifolds.

The constructional example illustrated in Fig. 4 differs from that shown in Fig. 1 only by the interconnections at A and B of the discharge conduits 12 and 14 and 11 and 13 respectively of the two compressors 7 and 8.

In the constructional example illustrated in Fig. 5 a six cylinder engine is shown provided with two exhaust turbines 5 and 6 respectively, each of the turbines having two turbine chambers 5a, 5b and 6a, 6b respectively. The upper ends of the cylinders 1, 2, 3 exhaust through the conduit 9 into the chamber 5a of the exhaust turbine 5 and the lower ends of these cylinders exhaust through conduit 9' into the chamber 5b of the same exhaust turbine. The upper ends of the cylinders 4, 25 and 26 exhaust through conduit 10 into the chamber 6a of the exhaust turbine 6 and the lower ends of these cylinders exhaust through conduit 10' into the chamber 6b of the same turbine. The compressed air from the compressor 7 is supplied to both ends of the cylinders 1, 2, 3 through conduits 11 and 12, and the air from the compressor 8 is supplied to both ends of the cylinders 4, 25 and 26 through conduits 13 and 14. The conduits 11 and 13 and 12 and 14 respectively may be interconnected as in the example illustrated in Fig. 4. Fig. 6 indicates the arrangement of the cranks of the engine shown in Fig. 5.

The constructional example illustrated in Fig. 7 differs from that shown in Fig. 5 in as much as only one exhaust turbine 5 is provided which, however, has four separate turbine chambers 5a, 5b, 5c and 5d. These four separate turbine chambers are so arranged that each one covers one-fourth of the guide vanes. The conduits 9 and 9' are again connected to the turbine chambers 5a and 5b respectively as in Fig. 5, whilst the conduits 10 and 10' are connected to the turbine chambers 5c and 5d respectively. Thus the upper and lower ends of every group of three cylinders exhaust into separate turbine chambers. The single compressor 7 delivers the compressed air through the conduits 11 and 12 to both ends of all six cylinders.

With the arrangement shown in Fig. 7, the exhaust puffs in each manifold follow each other in about 240° crank angle, so that the scavenging of one cylinder is not disturbed by the exhaust of another. By leading the exhaust gas of 3 cylinders into the same manifold, four manifolds are needed and four turbine chambers, whereby these turbine chambers are made of the same volume. As all of said chambers are of the same volume, the same pressure fluctuations are obtained in them and consequently the same pressure drop, the same velocity in the guide vanes of the exhaust turbine, as the pressure drop is the same. The efficiency of the turbine is thereby much higher, than if different pressure drops would occur in the different turbine chambers.

The constructional example illustrated in Fig. 8 refers to an eight cylinder engine having cylinders 1, 2, 3, 4, 25, 26, 27 and 28. Two exhaust turbines 5 and 6 are provided driving compressors 7 and 8 respectively. As the cranks are displaced by angles of 180° (Fig. 9) both ends of the cylinders 1, 2, 3 and 4 exhaust through conduit 9 into the same turbine 5 and both ends of the cylinders 25, 26, 27 and 28 exhaust through conduit 10 into the turbine 6. The compressor 7 supplies charging air through conduit 11 to the lower ends of the cylinder 1, 2, 3 and 4 and through conduit 12 to the upper ends of these cylinders, whilst the conduits 13 and 14 respectively lead the compressed air from the compressor 8 to the lower and upper ends respectively of the cylinders 25, 26, 27 and 28. The conduits 11 and 13 and the conduits 12, 14 may be interconnected as shown in Fig. 4.

The constructional example illustrated in Fig. 10 refers also to an eight cylinder engine and differs from that described above in as much as the turbines 5 and 6 are each provided with two separate turbine chambers 5a, 5b and 6a, 6b respectively. The exhaust conduit 9 connects the upper ends of the cylinders 1, 2, 3 and 4 to the turbine chamber 5a, and the conduit 9' the lower ends of these cylinders to the turbine chamber 5b. In a similar manner the exhaust conduit 10 connects the upper ends of the cylinders 25, 26, 27 and 28 to the turbine chamber 6a and the exhaust conduit 10' connects the lower ends of these cylinders to the chamber 6b. The supply of the compressed air is the same as in Fig. 8.

In the constructional example illustrated in Fig. 11 an eight cylinder engine is provided with only one exhaust turbine 5 having separate turbine chambers 5a and 5b. The exhaust conduit 9, which corresponds to that shown in Fig. 8, is connected to the turbine chamber 5a and the exhaust conduit 10 (as in Fig. 8) is connected to the turbine chamber 5b. The conduit 11 supplies compressed air from the compressor 7 to the lower ends of all the eight cylinders and the conduit 12 to the upper ends of all the cylinders.

The constructional example illustrated in Fig. 12 differs from that of Fig. 11 in as much as the single exhaust turbine 5 has four separate turbine chambers 5a, 5b, 5c and 5d into which the conduits 9, 9', 10 and 10' lead the exhaust gases from the same cylinder ends as in Fig. 10. The supply of compressed air is similar to that shown in Fig. 11.

In the constructional example illustrated in Fig. 13 a twelve cylinder engine is shown having cylinders 1, 2, 3, 4, 25, 26, 27, 28, 29, 30, 31, and 32. There are two exhaust turbines 5 and 6 driving compressors 7 and 8. Each of the two turbines is provided with two separate chambers 5a, 5b and 6a, 6b respectively. The one ends of every group of six cylinders exhaust into a turbine chamber, for instance the lower ends of cylinders 4, 25, 26, 27, 28 and 29 exhaust through conduit 9 into chamber 5a; the lower ends of cylinder 1, 2, 3, 30, 31 and 32 are connected by conduit 9' to the chamber 5b; the upper cylinder ends of the first group are connected by conduit 10' to the chamber 6b and the upper cylinder ends of the second group by conduit 10 to the chamber 6a. The compressor 7 supplies compressed air to both ends of the cylinders 1, 2, 3, 4, 25 and 26, i. e. to the lower ends by conduit 11 and to the upper ends by conduit 12; the compressor 8 is connected by conduit 13 to the lower ends of the cylinders 27, 28, 29, 30, 31 and 32 and by conduit 14 to the upper ends of the same cylinders. The two conduits 11 and 13 and 12 and 14 may be connected to each other as shown in Fig. 4. The crank positions are indicated in Fig. 14.

Fig. 15 differs from Fig. 14 in as much as only one exhaust turbine 6 is provided having four separate turbine chambers 6a, 6b, 6c and 6d. As regards the exhaust the cylinders are subdivided into the same groups as in Fig. 14, the exhaust conduit 10 leads to turbine chamber 6a, the conduit 10' to chamber 6b, the conduit 9 to chamber 6c and the conduit 9' to chamber 6d. The pressure conduit 14 of the compressor 8 supplies the upper ends of all the twelve cylinders with compressed air and the conduit 13 the lower ends of all the cylinders.

The arrangement of the exhaust piping and of the compressed air piping may be applied in a similar manner to engines having more than twelve cylinders.

I claim:

1. In a plant of the type described, in combination a double-acting multicylinder internal combustion engine adapted to utilize a precompressed charge, said engine having outer and inner combustion chambers, pistons and piston rods, the piston rods passing through said inner combustion chambers, an exhaust turbine for a plurality of combustion chambers, and connected thereto, separate jet chambers for a plurality of combustion chambers, means to conduct exhaust gases from a plurality of inner and outer combustion chambers to the said turbine jet chambers, a charge compressor mechanically connected with said turbine to be driven thereby, means to conduct the precompressed charge from the precompressor to the cylinders to scavenge and charge said cylinders, whereby a greater volume of exhaust gases is supplied the turbine from the outer cylinder sides than from the inner cylinder sides, a higher mean exhaust gas pressure obtains in each turbine jet chamber during the exhaust of the outer cylinder sides, than during the exhaust from the inner cylinder sides and the exhaust pressure of the inner cylinder sides remains below the pre-compression pressure for a longer period than the exhaust pressure of the outer cylinder sides.

2. In a plant of the type described, in combination a double-acting multicylinder internal combustion engine adapted to utilize a precompressed charge, said engine having outer and inner combustion chambers, pistons and piston rods, the piston rods passing through said inner combustion chambers, an exhaust turbine for a plurality of combustion chambers, and connected thereto, separate jet chambers for a plurality of combustion chambers, means to conduct exhaust gases from a plurality of inner and outer combustion chambers to the said turbine jet chambers, a charge compressor mechanically connected with said turbine to be driven thereby, means to conduct the precompressed charge from the precompressor to the cylinders, to scavenge and charge said cylinders, whereby a greater volume of exhaust gases is supplied the turbine from the outer cylinder sides than from the inner cylinder sides, a higher mean exhaust gas pressure obtains in each turbine jet chamber during the exhaust of the outer cylinder sides than during the exhaust from the inner cylinder sides and the exhaust pressure of the inner cylinder sides remains below the pre-compression pressure for a longer period than the exhaust pressure of the outer cylinder sides and the scavenging period is longer for the inner cylinder sides than for the outer cylinder sides.

ALFRED BUCHI.